(12) United States Patent
Nakamura et al.

(10) Patent No.: US 7,088,571 B2
(45) Date of Patent: Aug. 8, 2006

(54) ELECTRIC DOUBLE-LAYER CAPACITOR

(75) Inventors: Mami Nakamura, Chiba (JP); Ryutaro Nozu, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 0 days.

(21) Appl. No.: 11/174,634

(22) Filed: Jul. 6, 2005

(65) Prior Publication Data

US 2006/0007637 A1    Jan. 12, 2006

(30) Foreign Application Priority Data

Jul. 6, 2004    (JP) ............... 2004-199039

(51) Int. Cl.
*H01G 9/00* (2006.01)
(52) U.S. Cl. ...................... 361/502; 361/503
(58) Field of Classification Search ......... 361/502–504
See application file for complete search history.

(56) References Cited

U.S. PATENT DOCUMENTS 5,959,830 A * 9/1999 Inagawa et al. ............. 361/502
6,349,027 B1 * 2/2002 Suhara et al. ............... 361/502
2001/0020319 A1   9/2001 Farahmandi et al.

FOREIGN PATENT DOCUMENTS

| EP | 1-043-743 A1 | 10/2000 |
|---|---|---|
| EP | 1-139-356 A1 | 10/2001 |
| EP | 1-411-533 A1 | 4/2004 |
| JP | 09-260214 | 10/1997 |
| JP | 09-289140 | 11/1997 |
| JP | 10-256088 | 9/1998 |
| JP | 2001-068380 | 3/2001 |
| JP | 2001-110678 | 4/2001 |
| JP | 2002-266281 | 9/2002 |
| JP | 2004-31986 * | 1/2004 |
| WO | WO 02/39468 A2 | 5/2002 |

* cited by examiner

*Primary Examiner*—Eric W. Thomas
(74) *Attorney, Agent, or Firm*—Westerman, Hattori, Daniels & Adrian, LLP.

(57) ABSTRACT

An electric double-layer capacitor has an electrolyte solution and an element constructed of a positive electrode and a negative electrode which are each composed of a current collecting substrate and an active material composition, and a separator situated between the positive and negative electrodes. When the element is in place within the capacitor, the portion of the separator sandwiched between the active material compositions of the respective electrodes has a pore volume which is at least 0.4 times the total pore volume of the positive and negative electrodes. This construction enables the separator to hold the electrolyte solution required by the electrodes for charging and discharging, thus endowing the capacitor with a high capacitance and a long cycle life.

8 Claims, 2 Drawing Sheets

ELECTRIC DOUBLE-LAYER CAPACITOR

CROSS-REFERENCE TO RELATED APPLICATION

This non-provisional application claims priority under 35 U.S.C. §119(a) on Patent Application No. 2004-199039 filed in Japan on Jul. 6, 2004, the entire contents of which are hereby incorporated by reference.

BACKGROUND OF THE INVENTION

1. Field of the Invention

The present invention relates to electric double-layer capacitors, and particularly electric double-layer capacitors suitable for use as automotive power supplies and power supplies for electrical storage systems.

2. Prior Art

An electric double-layer capacitor is an electrochemical device composed of a positive electrode, a negative electrode and a solution containing positive and negative ions (electrolyte solution). It uses a very thin dielectric layer, or electric double layer, that forms at the interfaces between the electrodes and the electrolyte solution as a dielectric, and is capable of storing and discharging electricity by the adsorption and release of negative ions at the positive electrode and positive ions at the negative electrode.

In such an electric double-layer capacitor, a separator is generally provided between the positive electrode and the negative electrode for the dielectric separation of the positive and negative electrodes and to hold the electrolyte solution.

Examples of separators used in electric double-layer capacitors include separators made of cellulose fibers (see JP-A 1998-256088), polyolefin nonwoven fabrics (see JP-A 2001-68380, JP-A 2001-110678, and JP-A 2002-266281), and porous polymer films.

However, electric double-layer capacitors which use a cellulose separator do not have a long enough life on account of the low chemical stability of cellulose itself. Polyolefin nonwoven fabric and porous polymer film generally have a lower melting point than cellulose and thus lack thermal stability. In addition, these latter separators can be manufactured to a porosity of at best 40 to 60 vol %, which is low compared to the 60 to 70 vol % porosity of cellulose separators. Accordingly, the amount of electrolyte solution such separators can hold is small and they also have a poor ability to absorb electrolyte solution.

Separators composed of glass fibers are described in JP-A 1997-289140 and JP-A 1997-260214. These glass fiber separators have an excellent chemical stability, thermal stability and electrolyte absorption. In addition, because they can be manufactured to a porosity of about 80 vol %, they also have an excellent ability to hold electrolyte solution.

However, such glass fiber separators have a lower mechanical strength during drying and during electrolyte absorption than do the other types of separators mentioned above. Therefore, in elements which in fact contain a glass fiber separator, when the separator is subjected to pressure during capacitor production, the thickness decreases, making it difficult to maintain the shape of the separator. As a result, the porosity within the separator decreases.

SUMMARY OF THE INVENTION

It is therefore an object of the invention to provide an electric double-layer capacitor which includes a separator having a pore volume capable of holding the electrolyte solution needed by the positive electrode and negative electrode to carry out charging and discharging, and which has a high capacitance and an excellent longevity.

We have discovered that, in an electric double-layer capacitor consisting in part of an electrolyte solution and an element constructed of a positive electrode and a negative electrode which are each composed of a current collecting substrate and an active material composition layered onto one side of the substrate and at least one of which is a polarizable electrode, and a separator that lies between the positive and negative electrodes in a state of contact with the surface of the active material compositions thereof, by setting the pore volume of the portion of the separator sandwiched between the respective active material compositions of the positive and negative electrodes, when the element is in place within the capacitor, in a specific range relative to the total pore volume within the positive and negative electrodes, there can be obtained electric double-layer capacitors having a high capacitance and an excellent longevity.

Accordingly, the invention provides the following electric double-layer capacitors and an electric storage system that uses the same.

(1) An electric double-layer capacitor having an element constructed of a positive electrode and a negative electrode which are each composed of a current collecting substrate and an active material composition layered onto one side of the substrate, at least one of which is a polarizable electrode, and which together have a total pore volume, and a separator that lies between the positive and negative electrodes in a state of contact with the active material compositions thereof, and an electrolyte solution; wherein, when the element is in place within the capacitor, a portion of the separator is sandwiched between the respective active material compositions of the positive and negative electrodes and has a pore volume which is at least 0.4 times the total pore volume within the positive and negative electrodes.

(2) The electric double-layer capacitor of (1) above, wherein the pore volume of the portion of the separator sandwiched between the respective active material compositions is from 0.4 to 5.0 times the total pore volume within the positive and negative electrodes.

(3) The electric double-layer capacitor of (1) or (2) above, wherein the separator contains 70.0 to 99.9 wt % of at least one material selected from the group consisting of cellulose, polypropylene, polyethylene, polyester and glass.

(4) The electric double-layer capacitor of (3) above, wherein the separator contains 70.0 to 99.9 wt % of glass fibers.

(5) The electric double-layer capacitor of any one of (1) to (4) above, wherein the separator has a porosity of 80 to 98 vol % when a stress of 20 to 200 kPa is applied thereto.

(6) The electric double-layer capacitor of any one of (1) to (5) above, wherein the positive electrode has a pore volume, exclusive of its current collecting substrate, of 50 to 80 vol %, and the negative electrode has a pore volume, exclusive of its current collecting substrate, of 55 to 90 vol %.

(7) The electric double-layer capacitor of any one of (1) to (6) above, wherein the electrolyte solution is contained in an amount of 90.0 to 100.0 vol % based on the total pore volume of the element.

(8) The electric double-layer capacitor of any one of (1) to (6) above, wherein the electrolyte solution is an organic electrolyte solution containing a quaternary ammonium salt or a quaternary phosphonium salt.

(9) An electric storage system having a power supply composed of an electric double-layer capacitor of any one of (1) to (8) above.

In the electric double-layer capacitor of the invention, because the pore volume of the portion of the separator sandwiched between the respective active material compositions of the positive and negative electrodes has been set within a specific range relative to the total pore volume within the positive and negative electrodes, the separator is able to hold the electrolyte solution required by the positive and negative electrodes to charge and discharge the capacitor. As a result, the capacitance can be increased and the life of the capacitor can be prolonged.

By using glass as the separator material, properties of the separator such as its chemical stability, thermal stability and electrolyte absorption can be increased, enabling the capacitance and life of the capacitor to be increased even further.

BRIEF DESCRIPTION OF THE DIAGRAMS

DETAILED DESCRIPTION OF THE INVENTION

Figure 1:
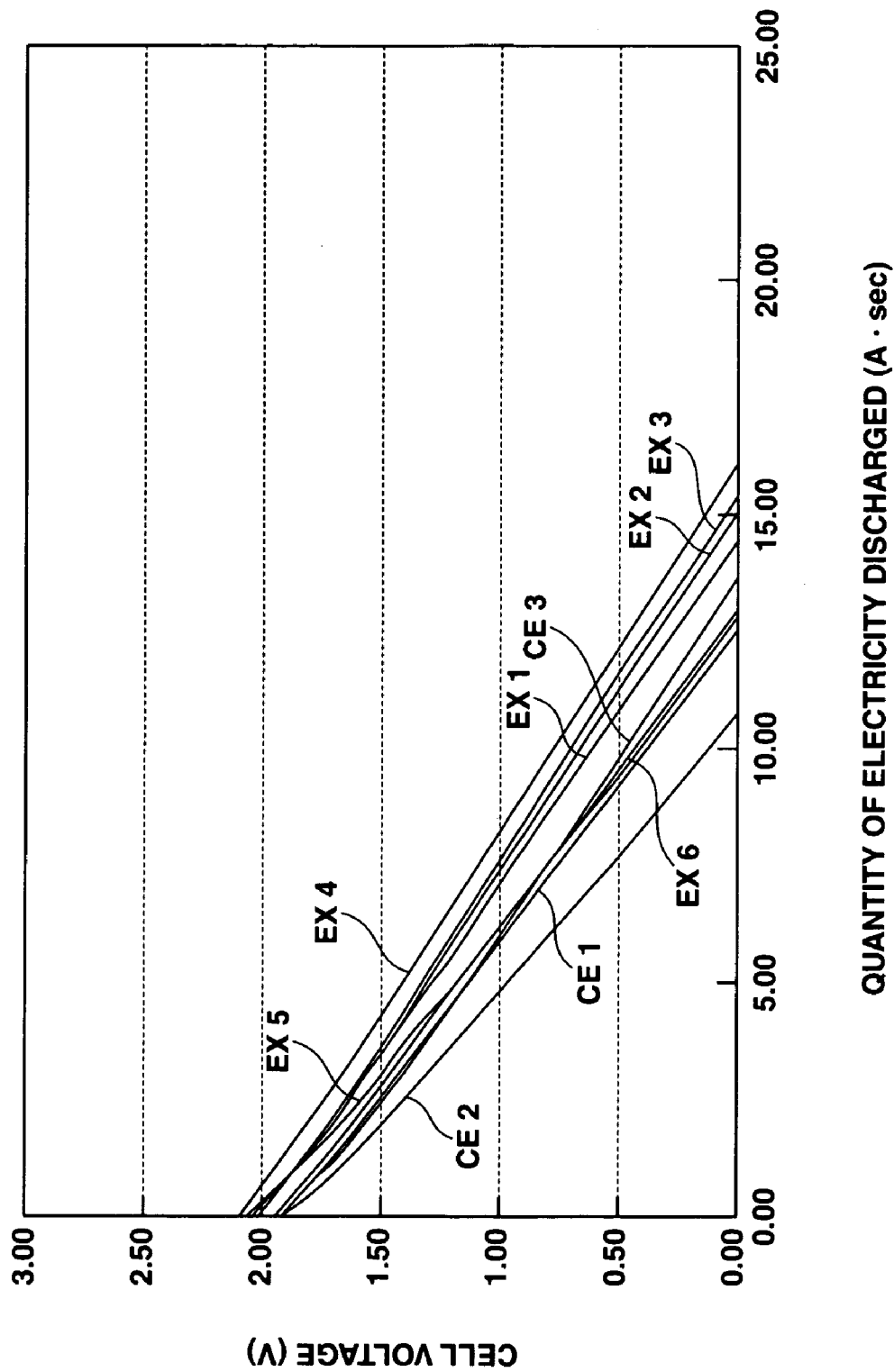
FIG. 1 is a graph showing charge-discharge electrode plots for the capacitors obtained in Examples 1 to 6 and Comparative Examples 1 to 3.

The electric double-layer capacitor of the invention includes an element constructed of a positive electrode and negative electrode which are each composed of a current collecting substrate and an active material composition layered onto one side of the substrate and at least one of which is a polarizable electrode, and a separator that lies between the positive and negative electrodes in a state of contact with the active material compositions. The capacitor also includes an electrolyte solution. When the element is in place within the capacitor, the portion of the separator sandwiched between the respective active material compositions of the positive and negative electrodes has a pore volume (referred to below as the "effective pore volume") which is at least 0.4 times the total pore volume within the positive and negative electrodes.

Here, letting the regions of the overall front and back faces of the separator which are in contact with the surfaces of the positive and negative active material compositions be reference planes, "effective pore volume of the separator" refers to the pore volume of the portion of the separator present between these two reference planes. For example, if the respective active material compositions are coated and layered onto the substrate in a square shape as seen from above, this portion is the figure formed by joining the mutually opposed vertices of the two square regions in contact with each active material composition. A single separator or a plurality of separators in any number may be used. When a plurality of separators are used, "effective pore volume of the separator" refers to the effective pore volume of the separators considered collectively as a single separator.

In electric double-layer capacitors which use an ordinary electrolyte solution containing 10 to 50 wt % of an electrolyte salt such as a quaternary ammonium salt, as charging proceeds, the anions adsorb to the positive electrode surface and the cations adsorb to the negative electrode surface. As a result, the concentration of the electrolyte solution decreases, ion mobility decreases, and the charge performance falls. By setting the effective pore volume within the separator when the element is in place within the capacitor in the above-indicated range, the amount of electrolyte solution that can be held within the separator increases, thus making it possible to prevent a conspicuous decline in the charge performance of the capacitor.

When the effective pore volume within the separator is less than 0.4 times the total pore volume within the positive and negative electrodes, it is likely to be impossible to efficiently suppress a drop in the above charge performance. Moreover, it may not be possible to improve to a sufficient degree the capacitance of the capacitor. Accordingly, the effective pore volume within the separator is preferably at least 0.5 times, more preferably at least 0.6 times, and even more preferably at least 0.65 times, the total pore volume within the positive and negative electrodes.

Increasing the effective pore volume within the separator increases the capacitance of the electric double-layer capacitor. However, for manufacturing-related reasons, it is not possible to unconditionally increase the effective pore volume within the separator. Moreover, when the effective pore volume within the separator exceeds a certain value, there is a tendency for the volume and mass alone to increase while the energy density decreases. Accordingly, the effective pore volume within the separator is preferably not more than about 5 to 6 times the total pore volume within the positive and negative electrodes, although the effective pore volume is not limited to within this range.

The material making up the separator used in the invention is not subject to any particular limitation, provided the effective pore volume within the separator can be set within the above-indicated range. However, given the need for chemical and thermal stability to electrolyte solutions such as aqueous sulfuric acid solutions, aqueous alkali metal hydroxide solutions, salt-containing aqueous solutions, and organic solutions such as ammonium salt-containing propylene carbonate, and given also the need for chemical and thermal stability to carbonaceous materials such as activated carbon, it is preferable for the separator to contain 70.0 to 99.9 wt % of at least one material selected from the group consisting of cellulose, polypropylene, polyethylene, polyester and glass. If the content of these materials is less than 70.0 wt %, side reactions due to the metallic elements, pulp, ash and other substances present as impurities or additives easily occur, so that the life of the capacitor may shorten.

A separator having a glass fiber content of 70.0 to 99.9 wt %, and particularly 80.0 to 99.9 wt %, is especially preferred. In this way, the chemical stability, thermal stability, electrolyte absorption and other properties of the capacitor can be further improved, enabling the capacitor to achieve an even longer life and a higher capacitance.

During manufacture of the electric double-layer capacitor, to reduce the interfacial resistance between the current collecting substrates and the active material compositions and between the electrodes and the separator, a mechanical stress of about 20 to 200 kPa is generally applied in a direction perpendicular to the plane of the element.

In the electric double-layer capacitor of the invention, when this stress is applied during capacitor production, it is preferable for the separator to have a porosity of at least 80 vol %. By setting the porosity of the separator within this range, the separator after incorporation into the element has a good electrolyte absorption ability, enabling the electrostatic capacitance of the electric double-layer capacitor to be increased.

Specifically, it is advantageous for the separator to have a porosity of 80 to 98 vol %, and preferably 82 to 95 vol % when a stress of 20 to 200 kPa, and particularly 50 to 100 kPa, has been applied thereto.

The porosity of a separator having a glass fiber content of 70.0 to 99.9 wt % is normally at least 90 vol % when subjected to a mechanical stress of 20 kPa.

The positive electrode and negative electrode in the element are each composed of at least a current collecting substrate on a surface of which an active material composition slurry (paste) has been coated or otherwise layered. These electrodes are generally fabricated by mixing ingredients such as an electrode active material, an electrically conductive material and a binder in a solvent such as N-methylpyrrolidone to form an active material composition-forming slurry, coating and layering the slurry onto a current collecting substrate, then drying and rolling.

At this time, by making the electrode density high, the interfacial resistance between the current collecting substrate and the active material composition decreases, enabling the internal impedance of the resulting capacitor cell to be reduced. However, increasing the electrode density lowers the pore volume within the electrode. This in turn reduces the amount of the electrolyte solution, which is required to charge and discharge the capacitor, and thus lowers the electrostatic capacitance.

In addition, when the size of the solvated ions is also taken into consideration, because the cations are generally larger than the anions, the negative electrode is required to have a larger electrode surface area than the positive electrode.

In light of the above and the ease of manufacture, it is thus preferable for the positive electrode to have a pore volume, exclusive of its current collecting substrate, of 50 to 80 vol %, and especially 55 to 80 vol %, and for the negative electrode to have a pore volume, exclusive of its current collecting substrate, of 55 to 90 vol %, and especially 60 to 90 vol %.

No particular limitations are imposed on the current collecting substrate and on the electrode active material, electrically conductive material and binder making up the active material composition. These may be selected as appropriate from among known materials used in electric double-layer capacitors.

Exemplary electrode active materials include activated carbons obtained by firing and activating various raw materials, such as coconut shells, coffee beans, bamboo, sawdust, coal pitch, petroleum pitch, coke, mesophase carbon, phenolic resins and polyvinyl chloride.

Exemplary electrically conductive materials include carbon black, Ketjenblack, acetylene black, carbon whiskers, carbon fibers, natural graphite, synthetic graphite, titanium oxide, ruthenium oxide, and fibers made of a metal such as aluminum or nickel.

Examples of binders that may be used include polytetrafluoroethylene, polyvinylidene fluoride, carboxymethyl cellulose, fluoroolefin copolymer crosslinked polymers, polyvinyl alcohol, polyacrylic acid, polyimide, petroleum pitch, coal pitch and phenolic resins.

Examples of materials that may be used as the current collecting substrate in the positive electrode include aluminum foil and aluminum oxide foil. Examples of materials that may be used as the current collecting substrate in the negative electrode include copper foil, nickel foil, and metal foils having a copper plating film or nickel plating film formed on the surface thereof.

Based on the total pore volume of the element, the electric double-layer capacitor of the invention contains preferably 90.0 to 100.0 vol %, and more preferably 95.0 to 100.0 vol %, of electrolyte solution.

By setting the electrolyte solution content within the above range, it is possible to ensure that the number of ions needed to charge and discharge the capacitor are present without increasing the surplus volume within the capacitor, in addition to which gases that evolve at the electrodes during charging can be allowed to pass through. The resulting capacitor can thus be efficiently charged and discharged repeatedly, enabling a high capacitance and a long life to be achieved.

Electrolyte solutions composed of known electrolytes and solvents can be used without particular limitation as the electrolyte solution in the electric double-layer capacitor of the invention, although organic electrolyte solutions containing a quaternary ammonium salt or a quaternary phosphonium salt as the electrolyte are preferred.

Any of various known quaternary ammonium salts and quaternary phosphonium salts may be suitably selected and used as the electrolyte, although a quaternary ammonium salt or quaternary phosphonium salt of formula (1) below and having the properties of an ionic liquid is preferred.

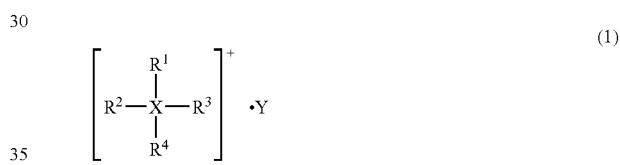

In the formula, $R^1$ to $R^4$ are each independently an alkyl of 1 to 5 carbons or an alkoxyalkyl of the formula R'—O—$(CH_2)_n$—, R' being methyl or ethyl and the letter n being an integer from 1 to 4, and any two from among $R^1$, $R^2$, $R^3$ and $R^4$ may together form a ring, with the proviso that at least one of groups $R^1$ to $R^4$ is an alkoxyalkyl of the above formula. X is a nitrogen or phosphorus atom, and Y is a monovalent anion.

Exemplary alkyls having 1 to 5 carbons include methyl, ethyl, propyl, 2-propyl, butyl and pentyl. Exemplary alkoxyalkyl groups of the formula R'—O—$(CH_2)_n$— include methoxymethyl, ethoxymethyl, methoxyethyl, ethoxyethyl, methoxypropyl, ethoxypropyl, methoxybutyl and ethoxybutyl.

Exemplary compounds in which two groups from among $R^1$, $R^2$, $R^3$ and $R^4$ together form a ring include, when X is a nitrogen atom, quaternary ammonium salts containing an aziridine, azetidine, pyrrolidine or piperidine ring; and, when X is a phosphorus atom, quaternary phosphonium salts containing a pentamethylenephosphine (phosphorinane) ring.

No particular limitation is imposed on the monovalent anion Y in above formula (1). Illustrative examples include $BF_4^-$, $PF_6^-$, $AsF_6^-$, $SbF_6^-$, $AlCl_4^-$, $HSO_4^-$, $ClO_4^-$, $CH_3SO_3^-$, $CF_3SO_3^-$, $CF_3CO_2^-$, $(CF_3SO_2)_2N^-$, $Cl^-$, $Br^-$ and $I^-$.

Of the quaternary ammonium salts and quaternary phosphonium salts having the properties of an ionic liquid, those of formula (2) below are preferred.

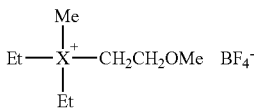

(2)

In formula (2), X is the same as above, Me stands for methyl, and Et stands for ethyl.

Illustrative examples of nonaqueous solvents that may be used in the organic electrolyte solution include acyclic ethers such as dibutyl ether, 1,2-dimethoxyethane, 1,2-ethoxymethoxyethane, methyl diglyme, methyl triglyme, methyl tetraglyme, ethyl glyme, ethyl diglyme, butyl diglyme, and glycol ethers (e.g., ethyl cellosolve, ethyl carbitol, butyl cellosolve, butyl carbitol); heterocyclic ethers such as tetrahydrofuran, 2-methyltetrahydrofuran, 1,3-dioxolane and 4,4-dimethyl-1,3-dioxane; butyrolactones such as γ-butyrolactone, γ-valerolactone, δ-valerolactone, 3-methyl-1,3-oxazolidin-2-one and 3-ethyl-1,3-oxazolidin-2-one; and; solvents commonly used in electrochemical devices, such as amide solvents (e.g., N-methylformamide, N,N-dimethylformamide, N-methylacetamide, N-methylpyrrolidinone), carbonate solvents (e.g., diethyl carbonate, dimethyl carbonate, ethyl methyl carbonate, propylene carbonate, ethylene carbonate, styrene carbonate), and imidazolidinone solvents (e.g., 1,3-dimethyl-2-imidazolidinone). Any one or mixtures of two or more of these solvents may be used.

Next, examples of methods for measuring and calculating the pore volumes within the positive electrode, negative electrode and separator of the inventive electric double-layer capacitor are described.

[Measurement and Calculation of True Density of Materials Included in Electrodes and Separator]

This is carried out in general accordance with JIS Z-8807 (Method of Measuring the Specific Gravity of Solids).

First, a liquid is selected from among ion-exchanged water (or pure water), ethanol and liquid paraffin. The specific gravity of the liquid selected is measured as follows.

The liquid is placed in a pycnometer within a given temperature and humidity environment (when ion-exchanged water or pure water has been chosen as the liquid, 4° C. is desirable), and the mass and volume are measured.

Letting the mass of the pycnometer before adding the liquid be $M_0$, the total mass of the liquid and the pycnometer after adding the liquid be $M_a$, and the volume of the liquid added be $V_1$, the specific gravity of the liquid is represented as follows.

$$(M_a - M_0)/V_1$$

Next, the pycnometer is emptied once again, after which the sample to be measured is added to the bottle and the mass is measured within the same environment as above. This mass is called $M_b$.

Using a vacuum desiccator and a rotary pump, the bottle is then evacuated to about several torr for a period of 30 minutes, following which the mass ($M_c$) and volume ($V_c$) are similarly measured.

Based on the results of these measurements, the true density of the sample is calculated as follows.

$$(M_b - M_0)/[V_c - (M_c - M_b)/\{(M_a - M_0)/V_1\}]$$

[Measurement and Calculation of Pore Volume within Electrode]

Measurement samples are prepared by cutting positive and negative electrode sheets into narrow strips of width $x_e$ and length $y_e$ such that the electrode substrate (current collector) face and the active material composition face are both of the same size.

The thickness of the electrode sample is called $t_m$ and the thickness of the electrode substrate (current collector) is called $t_b$ ($t_b$ is measured prior to filling). The electrode sample is dried at 80° C. for 60 minutes under a dew point of −40° C. or below, and the mass after drying is called $m_m$.

The mass mixing ratios of the active material, electrical conductive material, binder and other substances included in the active material composition are respectively $W_1$, $W_2$, $W_3$ and $W_4$; their respective true densities are $d_1$, $d_2$, $d_3$ and $d_4$; and the apparent density of the electrode substrates is $d_b$.

The average true density of the active material composition is thus expressed as $$(W_1+W_2+W_3+W_4)/(W_1/d_1+W_2/d_2+W_3/d_3+W_4/d_4)$$

The apparent density of the active material composition is expressed as follows.

$$[(m_m - x_e \cdot y_e \cdot t_b \cdot d_b)/\{x_e \cdot y_e \cdot (t_m - t_b)\}]$$

In addition, the pore volume within the electrode is expressed as $$\{x_e \cdot y_e \cdot (t_m - t_b)\} - m_m/\{(W_1+W_2+W_3+W_4)/(W_1/d_1+W_2/d_2+W_3/d_3+W_4/d_4)\}$$

Accordingly, the porosity (%) of the electrode is given by $$[\{x_e \cdot y_e \cdot (t_m - t_b)\} - m_m/\{(W_1+W_2+W_3+W_4)/(W_1/d_1+W_2/d_2+W_3/d_3+W_4/d_4)\}]/\{x_e \cdot y_e \cdot (t_1 - t_2)\} \times 100$$

Letting the total electrode surface area of the positive and negative electrodes in the sample capacitor be $S_m$, the pore volume within the positive and negative electrodes of the capacitor is determined as follows.

$$[\{S_m \cdot (t_m - t_b)\} \times \text{porosity of the electrode}]/100$$

[Measurement and Calculation of (Effective) Pore Volume within Separator]

The separator to be measured is cut into narrow strips of width $x_s$ and length $y_s$ to give measurement samples (when measuring the effective pore volume, the size to which the strips are actually cut should be the same as the size of the active material composition face that will be used). The thickness of the measurement sample when a stress $P_s$ is applied thereto shall be denoted as $t_s$.

The measurement sample is dried at 80° C. for 60 minutes under a dew point of −40° C. or below, and the mass after drying is called $m_s$.

The ingredient mass ratios of the ingredients included in the separator to be measured are denoted as $w_1$, $w_2$, $w_3$, . . . , $w_n$ ($\Sigma w > 0.99$), and their respective true densities are denoted as $d_1$, $d_2$, $d_3$, . . . , $d_n$.

The average true density of the separator material is expressed as follows.

$$(w_1+w_2+w_3+ \ldots +w_n)/(w_1/d_1+w_2/d_2+w_3/d_3+ \ldots +w_n/d_n)$$

The apparent density of the separator is expressed as follows.

$$m_s/(x_s \cdot y_s \cdot t_s)$$

Moreover, the pore volume within the separator is expressed as follows.

$$x_s \cdot y_s \cdot t_s - m_s / \{(w_1+w_2+w_3+ \ldots +w_n)/(w_1/d_1+w_2/d_2+ w_3/d_3+ \ldots +w_n/d_n)\}$$

Accordingly, the porosity (%) of the separator is expressed as $$[x_s \cdot y_s \cdot t_s - m_s / \{(w_1+w_2+w_3+ \ldots +w_n)/(w_1/d_1+w_2/d_2+ w_3/d_3+ \ldots +w_n/d_n)\}]/(x_s \cdot y_s \cdot t_s) \times 100$$

Letting the total surface area of the separator be $S_s$, the pore volume within the separator of the sample capacitor is determined as follows.

$$[\{S_s \cdot t_s\} \times \text{porosity of the separator}]/100$$

[Setting the Element Thickness (Inside Dimension of Storage Case in Thickness Direction)]

The total thickness of the positive electrode (thickness per positive electrode×number of positive electrodes) in the element is called $t_p$, the total thickness of the negative electrode (thickness per negative electrode×number of negative electrodes) is called $t_n$, and the sum of both ($t_p+t_n$) is $t_e$.

The sum of the pore volume within the positive electrode and the pore volume within the negative electrode determined as described above is called $V_e$.

If the separator has a total surface area of $S_s$ and an average true density of $d_s$, and if, when the element is compressed, the separator apparent density is X, the thickness per separator is $t_s$ and the total number of separators layed up in the thickness direction is $n_s$, the pore volume within the separator is expressed as follows.

$$S_s \times t_s \times n_s \times (1-X/d_s)$$

Here, if it is assumed that the pore volume within the separator when the element has been assembled is from 0.4 to 5.0 times (the upper limit here being 5.0 times) the total pore volume within the positive and negative electrodes, then the following relationship must hold.

$$V_e \times 0.4 < S_s \times t_s \times n_s \times (1-X/d_s) < V_e \times 5.0$$

Therefore, letting the total thickness of members other than the positive and negative electrodes and the separator which are present in the thickness direction of the element be $t_a$, any $t_s$ may be selected so long as the element thickness (interior dimension of enclosure in thickness direction) $t_e+t_s \times n_s+t_a$ satisfies the relationship $$t_e+t_a+0.4 \times V_e \times d_s / \{S_s(d_s-X)\} < t_e+t_s \times n_s+t_a < t_e+t_a+5.0 \times V_e \times d_s / \{S_s(d_s-X)\}$$

Examples of ways to do this include the following.
(a) Use an enclosure having interior dimensions in the thickness direction of $t_e+t_s \times n_s+t_a$, and insert the element therein;
(b) Insert the element into an enclosure, then use fixing plates for providing an element thickness of $t_e+t_s \times n_s+t_a$ to compress and fix the element from outside the enclosure in the thickness direction under a stress $P_s$.

Either or both of these methods may be used.

The effective pore volume within the separator is not independent, and can be only a single value with respect to $t_s$. That is, there exists a one-to-one correspondence exists between the separator thickness after applying pressure and the effective pore volume within the separator. Therefore, selecting "any $t_s$" as mentioned above means the same as selecting an effective pore volume within the separator.

When pressure is applied so as to impart a given stress to one separator, the apparent density X of the separator also is not independent, but rather is a function of $t_s$. Specifically, for a separator of mass M, average true density $d_s$, surface area S and thickness $t_s$, the apparent density $X(t_s)$ is given as follows.

$$X(t_s)=(M/d_s)/(S \times t_s)$$

The above-described electric double-layer capacitor of the invention has a high capacitance and a good longevity. Electric storage systems containing such capacitors as a power supply are well-suited for a variety of uses, including automotive applications, and applications relating to the storage of electrical power, wind power generation, solar power generation, and fuel cells.

EXAMPLES

The following Examples and Comparative Examples are provided to illustrate the invention, and are not intended to limit the scope thereof.

Examples 1 to 6, and Comparative Examples 1 to 3

(1) Production of Activated Carbon (Electrode Active Material)

Shonol BRP-510F (Showa Highpolymer Co., Ltd.) was cured and infusibilized at 180° C., then coarsely milled. This coarsely milled material was carbonized and fired at 900° C., then steam activated, after which it was finely milled, thereby giving activated carbon.

(2) Manufacture of Element

An active material composition-forming slurry was prepared by adding 250 parts by weight of 1-methyl-2-pyrrolidone (NMP, available from Godo Solvents Co.) to a mixture of the activated carbon obtained in (1) above, Denka Black HS-100 (Denki Kagaku Kogyo K.K.) and PVDF (Sigma-Aldrich Japan K.K.) in a weight ratio of 100.0:5.0:5.5.

The slurry was coated onto one face of an aluminum oxide sheet (30CB, available from Japan Capacitor Industrial Co., Ltd.; t=0.030 mm), then dried and rolled. The coated sheet was then cut into pieces 50.0 mm (of which the coated portion accounted for 40.0 mm)×20.0 mm in size, and aluminum tape (t=3.0 mm) was welded to the uncoated portion to form electrodes.

Of the resulting electrodes, ones having a weight of 0.115 g and a thickness of 0.13 mm (filling density, 0.55 g/cc; pore volume, 45 mcc) were selected as positive electrodes, and others having a mass of 0.125 g and a thickness of 0.16 mm (filling density, 0.52 g/cc; pore volume, 65 mcc) were selected as negative electrodes.

An element was manufactured from two positive electrodes and two negative electrodes by assembling the electrodes so that the filled faces of each positive electrode faced the filled face of a negative electrode, with a separator of the type indicated in Table 1 disposed therebetween.

From one to four separators having a surface area of 54.0 mm×22.0 mm were laid up and used so as to give the pore volumes in the respective examples and comparative examples.

(3) Manufacture of Electric Double-Layer Capacitor

The element manufactured in (2) above was inserted into an aluminum laminate enclosure, and metal plates were pressed against the container parallel to the electrode faces under the various stresses indicated in Table 1 to fix the element.

Next, a 1.0 M solution of tetraethylammonium tetrafluoroborate in propylene carbonate (25 wt %, Toyama Chemical Co., Ltd.) as the electrolyte solution was poured in an excess amount with respect to the total pore volume of the element and a vacuum was drawn to ≦10 Torr for one hour, following which the excess solution was dumped out and the container was tightly sealed, thereby giving an electric double-layer capacitor cell. In each example, the amount of electrolyte solution filled into the capacitor cell at this time was 96 to 99 vol % with respect to the total pore volume of the element.

Example 7

An element manufactured in the same way as in above Example 2 was sandwiched between 1.00 mm thick polypropylene sheets, then inserted into an aluminum enclosure having a wall thickness of 0.40 mm and an inside width (thickness direction of element) of 2.88 mm. Next, the electrolyte solution was poured in an excess amount with respect to the total pore volume of the element and a vacuum of ≦10 Torr for one hour, following which the excess solution was dumped out and the container was tightly sealed, thereby giving an electric double-layer capacitor cell. The amount of electrolyte solution filled into the capacitor cell at this time was 99 vol % with respect to the total pore volume of the element.

Comparative Example 3: One sheet of Glass Paper GM100 (thickness at 20 kPa, 0.10 mm) produced by Nippon Sheet Glass Co., Ltd.

(2) Polyethylene Separator

Example 5: Four sheets of NI040A (polyethylene content, ≧70 wt %; thickness at 20 kPa, 0.040 mm) produced by Nippon Sheet Glass Co., Ltd.

Comparative Example 2: One sheet of N9420G (polyethylene content, 96 wt %; thickness at 20 kPa, 0.040 mm) produced by Asahi Chemical Industry Co., Ltd.

(3) Cellulose Separator (Cellulose Content, 97 wt %)

Example 6: Four sheets of TF40-35 (thickness at 20 kPa, 0.035 mm) produced by Nippon Kodoshi Corporation Comparative Example 1: One sheet of TF40-35, produced by Nippon Kodoshi Corporation The discharge performances of the sample capacitors obtained in Examples 1 to 4 and Comparative Examples 1 to 3 were measured as described below.

(1) The capacitor was subjected to constant-current/constant-voltage charging at a current of 10.0 mA to a cutoff voltage of 2.50 V, 10 minutes at rest, then discharging at a current of 10.0 mA. This charge/discharge cycle was carried out three times, and the discharge capacitance in the third cycle was treated as the initial capacitance.

The discharge performances of the sample capacitors obtained in Examples 5 and 6 were measured as follows.

TABLE 1

| | Separator | Stress (kPa) | Separator thickness (mm) Before element assembly | Separator thickness (mm) After element assembly | Separator porosity (vol %) Before element assembly | Separator porosity (vol %) After element assembly | Separator effective pore volume (mcc) | Total pore volume in positive electrode (mcc) | Total pore volume in negative electrode (mcc) | Total pore ratio (separator/ positive + negative electrodes) |
|---|---|---|---|---|---|---|---|---|---|---|
| Example 1 | glass | 50 ± 10 | 0.20 | 0.10 | 95 | 90 | 150 | 90 | 130 | 0.68 |
| Example 2 | glass | 50 ± 10 | 0.30 | 0.20 | 96 | 94 | 300 | 90 | 130 | 1.36 |
| Example 3 | glass | 30 ± 10 | 0.30 | 0.25 | 96 | 95 | 380 | 90 | 130 | 1.73 |
| Example 4 | glass | 50 ± 10 | 0.80 | 0.50 | 90 | 84 | 680 | 90 | 130 | 3.09 |
| Example 5 | polyethylene | 100 ± 10 | 0.16 | 0.13 | 77 | 72 | 150 | 90 | 130 | 0.68 |
| Example 6 | cellulose | 100 ± 10 | 0.14 | 0.10 | 70 | 58 | 93 | 90 | 130 | 0.42 |
| Example 7 | glass | — | 0.30 | 0.30 | 96 | 96 | 450 | 90 | 130 | 2.05 |
| Comparative Example 1 | cellulose | 100 ± 10 | 0.035 | 0.030 | 70 | 65 | 32 | 90 | 130 | 0.15 |
| Comparative Example 2 | polyethylene | 100 ± 10 | 0.040 | 0.030 | 60 | 50 | 24 | 90 | 130 | 0.11 |
| Comparative Example 3 | glass | 50 ± 10 | 0.10 | 0.050 | 85 | 70 | 56 | 90 | 130 | 0.25 |

In Table 1, the effective pore volume of the separator is not the total pore volume of the entire separator. Rather, it is the pore volume of that portion of the separator sandwiched between the respective electrode regions (reference planes) corresponding to the active material composition-coated surface area of 40.0 mm×30.0 mm. The following separators were used in the indicated examples.

(1) Glass Separator (Glass Content, 90 wt %)

Example 1: One sheet of Glass Paper GM200 (thickness at 20 kPa, 0.20 mm) produced by Nippon Sheet Glass Co., Ltd.

Examples 2, 3, 7: One sheet of Glass Paper GM300 (thickness at 20 kPa, 0.30 mm) produced by Nippon Sheet Glass Co., Ltd.

Example 4: Four sheets of Glass Paper GM200 produced by Nippon Sheet Glass Co., Ltd.

(2) The capacitor was subjected to constant-current/constant-voltage charging at a current of 1.0 mA to a cutoff voltage of 2.50 V, 10 minutes at rest, then discharging at a current of 1.0 mA. This charge/discharge cycle was carried out three times, and the discharge capacitance in the third cycle was treated as the initial capacitance.

FIG. 1 shows the third charge/discharge curves obtained in above charge/discharge tests (1) and (2). Table 2 shows the discharge capacitances.

TABLE 2

| | Discharge energy(initial capacitance)/mcc |
|---|---|
| Example 1 | 14.3 |
| Example 2 | 14.8 |
| Example 3 | 15.2 |

TABLE 2-continued

|  | Discharge energy(initial capacitance)/mcc |
|---|---|
| Example 4 | 16.5 |
| Example 5 | 12.5 |
| Example 6 | 12.4 |
| Comparative Example 1 | 11.8 |
| Comparative Example 2 | 9.7 |
| Comparative Example 3 | 12.3 |

As shown in Table 2, the sample capacitors obtained in Examples 1 to 6 had better discharge capacitances than the capacitors obtained in the comparative examples. The capacitors in Examples 1 to 5 in which separators made of glass were used had especially good discharge capacitances.

It is apparent from the discharge curves in FIG. 1 that the sample capacitors obtained in Examples 1 to 6 had increased discharge energies compared with those obtained in Comparative Examples 1 to 3.

Figure 2:
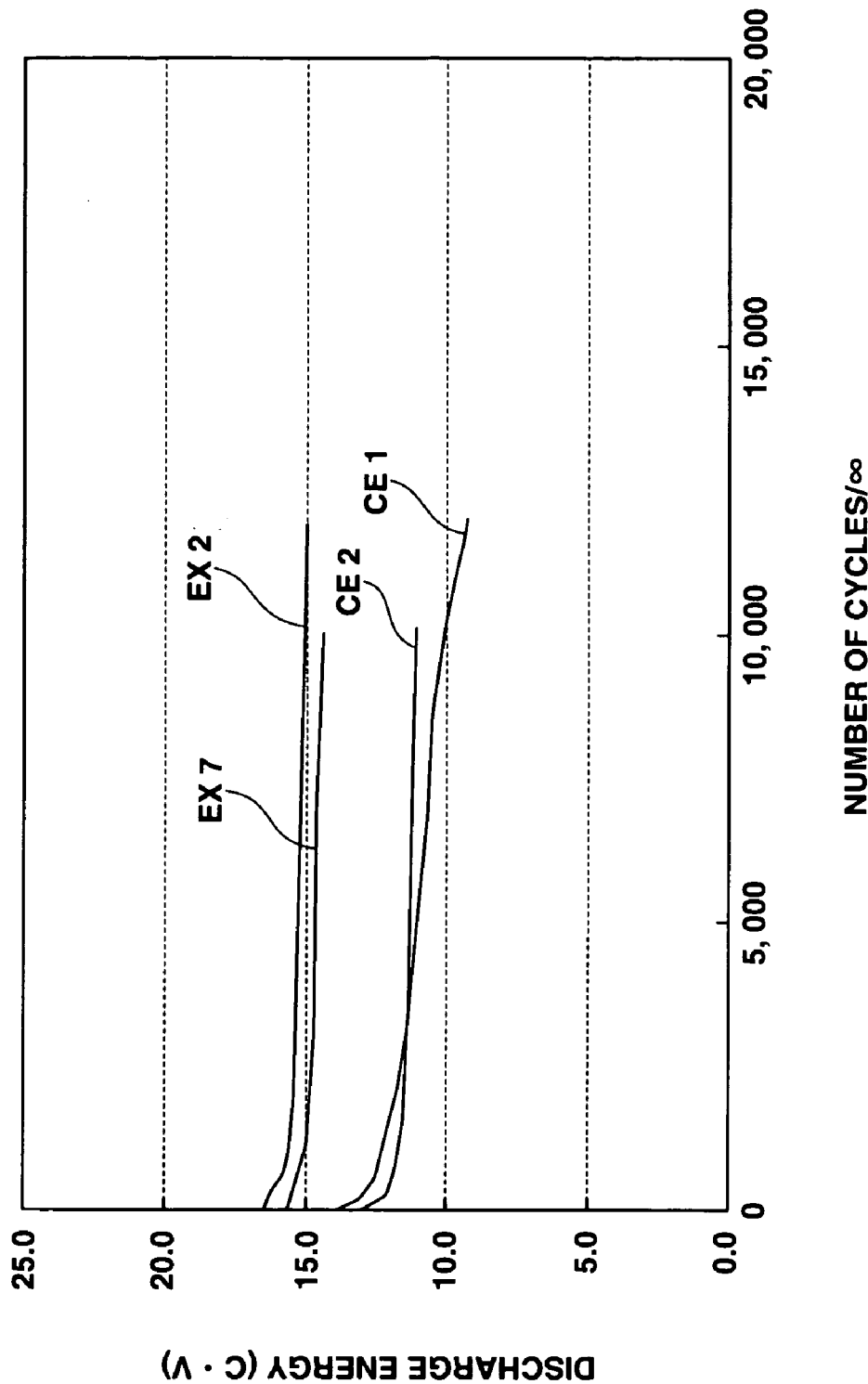
FIG. 2 is a graph showing the cycle characteristics of the capacitors obtained in Examples 2 and 7 and Comparative Examples 1 and 2.

Next, the cycle lives of the capacitors obtained in Examples 2 and 7 and in Comparative Examples 1 and 2 were tested under the following conditions: constant-current charging at a current of 10.0 mA to a cutoff voltage of 3.00 V, and discharge at a current of 10.0 mA to a voltage of 1.0 V. As shown in FIG. 2, the capacitors obtained in Examples 2 and 7 had higher discharge energies than the capacitors obtained in Comparative Examples 1 and 2, and thus also exhibited good cycle lives.

Japanese Patent Application No. 2004-199039 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An electric double-layer capacitor comprising:
   an element constructed of a positive electrode and a negative electrode which are each composed of a current collecting substrate and an active material composition layered onto one side of the substrate, at least one of which is a polarizable electrode, and which together have a total pore volume, and a separator that lies between the positive and negative electrodes in a state of contact with the active material compositions thereof, and
   an electrolyte solution;
   wherein, when the element group is in place within the capacitor, a portion of the separator is sandwiched between the respective active material compositions of the positive and negative electrodes and has a pore volume which is at least 0.4 times the total pore volume within the positive and negative electrodes, and
   the positive electrode has a pore volume, exclusive of its current collecting substrate, of 50 to 80 vol %. and the negative electrode has a pore volume, exclusive of its current collecting substrate, of 55 to 90 vol %.

2. The electric double-layer capacitor of claim 1, wherein the pore volume of the portion of the separator sandwiched between the respective active material compositions is from 0.4 to 5.0 times the total pore volume within the positive and negative electrodes.

3. The electric double-layer capacitor of claim 1, wherein the separator contains 70.0 to 99.9 wt % of at least one material selected from the group consisting of cellulose, polypropylene, polyethylene, polyester and glass.

4. The electric double-layer capacitor of claim 3, wherein the separator contains 70.0 to 99.9 wt % of glass fibers.

5. The electric double-layer capacitor of claim 1, wherein the separator has a porosity of 80 to 98 vol % when a stress of 20 to 200 kPa is applied thereto.

6. The electric double-layer capacitor of claim 1, wherein the electrolyte solution is contained in an amount of 90.0 to 100.0 vol % based on the total pore volume of the element.

7. The electric double-layer capacitor of claim 1, wherein the electrolyte solution is an organic electrolyte solution containing a quaternary ammonium salt or a quaternary phosphonium salt.

8. An electric storage system comprising a power supply composed of an electric double-layer capacitor of claim 1.

* * * * *